(12) United States Patent
Lee (10) Patent No.: US 8,811,034 B2
(45) Date of Patent: Aug. 19, 2014

(54) PORTABLE ELECTRONIC DEVICE

(75) Inventor: Hung-Yi Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 305 days.

(21) Appl. No.: 13/430,725

(22) Filed: Mar. 27, 2012

(65) Prior Publication Data

US 2013/0194760 A1 Aug. 1, 2013

(30) Foreign Application Priority Data

Feb. 1, 2012 (TW) .............................. 101103295 A (51) Int. Cl.
*H04B 1/03* (2006.01)
*H05K 5/02* (2006.01)

(52) U.S. Cl.
USPC ..... 361/814; 361/755; 455/575.3; 455/575.2; 455/575.1

(58) Field of Classification Search
USPC ................ 361/728–730, 755, 756, 741, 686; 455/575.1–575.3, 575.7; 439/377, 374
See application file for complete search history.

(56) References Cited

U.S. PATENT DOCUMENTS

| 7,042,711 | B2 * | 5/2006 | Tanaka et al. | ............... 361/679.1 |
| 7,092,246 | B2 * | 8/2006 | Tanaka et al. | ............ 361/679.27 |
| 7,865,151 | B2 * | 1/2011 | Cho | ............................. 455/90.3 |
| 8,032,192 | B2 * | 10/2011 | Park | ........................... 455/575.4 |
| 8,654,518 | B2 * | 2/2014 | Wei | ........................... 361/679.02 |
| 2007/0115255 | A1 | 5/2007 | Pan | |
| 2008/0167097 | A1 * | 7/2008 | Ko | ............................ 455/575.4 |
| 2008/0304215 | A1 * | 12/2008 | Chiu | .............................. 361/681 |

FOREIGN PATENT DOCUMENTS

| TW | I278216 | 4/2007 |
| TW | M367562 | 10/2009 |

OTHER PUBLICATIONS

"Office Action of Taiwan Counterpart Application", issued on Mar. 10, 2014, with English translation thereof, p. 1-p. 10.

* cited by examiner

*Primary Examiner* — Hung S Bui
(74) *Attorney, Agent, or Firm* — Jianq Chyun IP Office (57) ABSTRACT

A portable electronic device including a first body and a second body is provided. The first body has a first operating surface. The second body covers the first operating surface and includes a back cover and a main body. The back cover is slidably disposed on the first body along a first axis. The back cover is suitable for sliding relative to the first body, such that the first operating surface is exposed by the second body. The main body is pivoted to the back cover along a second axis and has a second operating surface. The main body is suitable for pivoting relative to the back cover to change a relative position between the first operating surface and the second operating surface. The first axis is parallel to the second operating surface, and the second axis is perpendicular to the second operating surface.

14 Claims, 6 Drawing Sheets

PORTABLE ELECTRONIC DEVICE

CROSS-REFERENCE TO RELATED APPLICATION

This application claims the priority benefit of Taiwan application serial no. 101103295, filed on Feb. 1, 2012. The entirety of the above-mentioned patent application is hereby incorporated by reference herein and made a part of this specification.

BACKGROUND OF THE INVENTION

1. Field of the Invention

The present invention relates to an electronic device and more particularly, to a portable electronic device.

2. Description of Related Art

In the modern information era, electronic products have developed an indispensable relationship with modern human life. Along with continual development of electronic technology, user-friendly electronic products with powerful functions have come forth and gradually replaced old electronic products. For example, tablet PC is convenient in use, and can even be operated by a stylus when laid on the desk or laps. With the rising of the smart portable electronic device, sliding type portable electronic devices combining tablet PC and input module, for example, keyboard module, are in high demand. The display screen of the sliding type portable electronic device can slide relative to the input module to expose the input module by which users can perform input action. In some of the sliding type portable electronic device, the display screen thereof can even pivot and incline to the input module for users to perform operation more comfortably.

Many display screens of the portable electronic devices can switch to landscape display mode or portrait display mode to meet the requirements of users. In most of the design of the sliding type portable electronic devices, the relative position between the input module and the display screen is for users to use the input module while viewing the images in landscape display mode, but users can not use the input module while viewing the images in portrait display mode with appropriate view angle, which causes inconvenience in use.

SUMMARY OF THE INVENTION

The present invention provides an electronic device which is more convenient in use.

The present invention provides a portable electronic device including a first body and a second body. The first body has a first operating surface. The second body covers the first operating surface and comprises a back cover and a main body. The back cover is slidably disposed on the first body along a first axis. The back cover is suitable for sliding relative to the first body such that the second body exposes the first operating surface. The main body is pivoted to the back cover along a second axis and has a second operating surface. The main body is suitable for pivoting relative to the back cover to change a relative position between the first operating surface and the second operating surface. The first axis is parallel to the second operating surface, and the second axis is perpendicular to the second operating surface.

According to an embodiment of the present invention, the first operating surface is an input interface, and the second operating surface is a display interface.

According to an embodiment of the present invention, when the second body exposes the first operating surface, the back cover is suitable for pivoting along a third axis, such that the second body inclines to the first body, wherein the third axis is perpendicular to the first axis and the second axis.

According to an embodiment of the present invention, the second operating surface is in rectangular shape and has a long side and a short side. The long side is parallel to the third axis, and the main body is suitable for pivoting relative to the back cover such that the short side is parallel to the third axis.

According to an embodiment of the present invention, when the second body exposes the first operating surface, the distance between the second axis and the short side is smaller than the distance between the second axis and the first operating surface.

According to an embodiment of the present invention, the first body comprises a base and at least one connecting element, the connecting element is pivoted to the base along the third axis, wherein the back cover is slidably disposed on the connecting element along the first axis.

According to an embodiment of the present invention, the first body further comprises a bracket. The number of the at least one connecting elements is two. Two opposing ends of the back cover are slidably disposed respectively on the two connecting elements, and two ends of the bracket are respectively fixed to the two connecting elements.

According to an embodiment of the present invention, the second body further comprises a first pivoting element and a second pivoting element. The first pivoting element having an axial hole is fixed on the main body. The second pivoting element having a shaft is fixed on the back cover, wherein the second pivoting element is pivotally connected to the axial hole along the second axis by the shaft.

According to an embodiment of the present invention, the first pivoting element has a boss, and the second pivoting element has a slot. The boss is slidably disposed in the slot and is suitable for sliding along the slot according to a relative pivoting between the first pivoting element and the second pivoting element. The slot has two opposing ends, and the two ends are suitable for stopping the boss in order to limit the pivoting range of the main body relative to the back cover.

According to an embodiment of the present invention, the portable electronic device further comprises a conducting wire, wherein the shaft is hollow so as to form a channel. The conducting wire passes the channel to electronically connect the main body and the first body.

According to an embodiment of the present invention, the portable electronic device further comprises a flexible printed circuit (FPC), wherein the back cover has a notch and is located between the main body and the first body, and the FPC passes through the notch to electronically connect the main body and the first body.

According to an embodiment of the present invention, the portable electronic device further comprises a printed circuit board (PCB), a flexible printed circuit (FPC) and a conducting wire. The PCB is fixed on the back cover. The FPC is connected between the PCB and the first body. The conducting wire is connected between the PCB and the main body, wherein the main body is electronically connected to the first body by the conducting wire, the PCB and the FPC.

Based on the above and other objectives, in the portable electronic device of the present invention, when the second body exposes the first operating surface of the first body, the main body of the second body can pivot relative to the back cover such that the second operating surface of the main body rotates relative to the first operating surface of the first body. Thus, users can adjust the relative position between the first operating surface and the second operating surface according to the requirement of the users for enhancing the convenience of the portable electronic device in use.

In order to make the aforementioned features and advantages of the present invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1A:
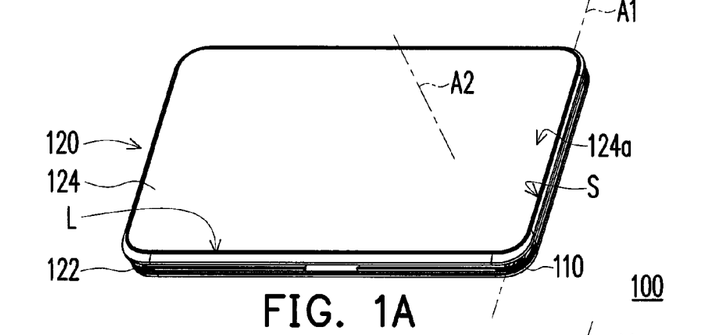
FIGS. 1A-1C are schematic flowcharts illustrating an operation of a portable electronic device according to an embodiment of the present invention.
Figure 1B:
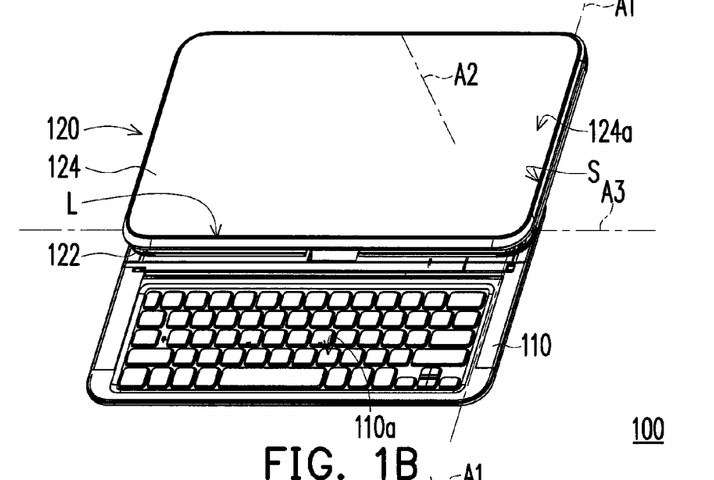
Figure 1C:
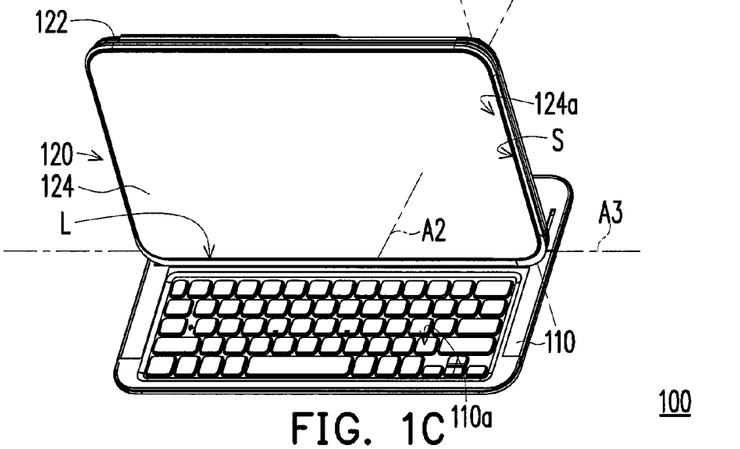

FIGS. 1A-1C are schematic flowcharts illustrating an operation of a portable electronic device according to an embodiment of the present invention. Referring to FIGS. 1A-1C, the portable electronic device 100 of the present embodiment includes a first body 110 and a second body 120. The first body 110 has a first operating surface 110a. The first operating surface 110a is, for example, an input interface (illustrated as a keyboard). The second body 120 having a back cover 122 and a main body 124 is suitable for, as shown in FIG. 1A, covering the first operating surface 110a. The back cover 122 is slidably disposed on the first body 110 along a first axis A1. The main body 124 having a second operating surface 124a is pivoted to the back cover 122 along a second axis A2. The second operating surface 124a is, for example, a display interface.

The back cover 122 is suitable for sliding relative to the first body 110 from the position shown in FIG. 1A to the position shown in FIG. 1B, such that the second body 120 exposes the first operating surface 110a. When the second body 120 exposes the first operating surface 110a as shown in FIG. 1B, the back cover 122 is suitable for pivoting along a third axis A3, such that the second body 120 inclines to the first body 110 as shown in FIG. 1C. In the present embodiment, the first axis A1 is parallel to the second operating surface 124a, the second axis A2 is perpendicular to the second operating surface 124a, and the third axis A3 is perpendicular to the first axis A1 and the second axis A2.

Figure 2A:
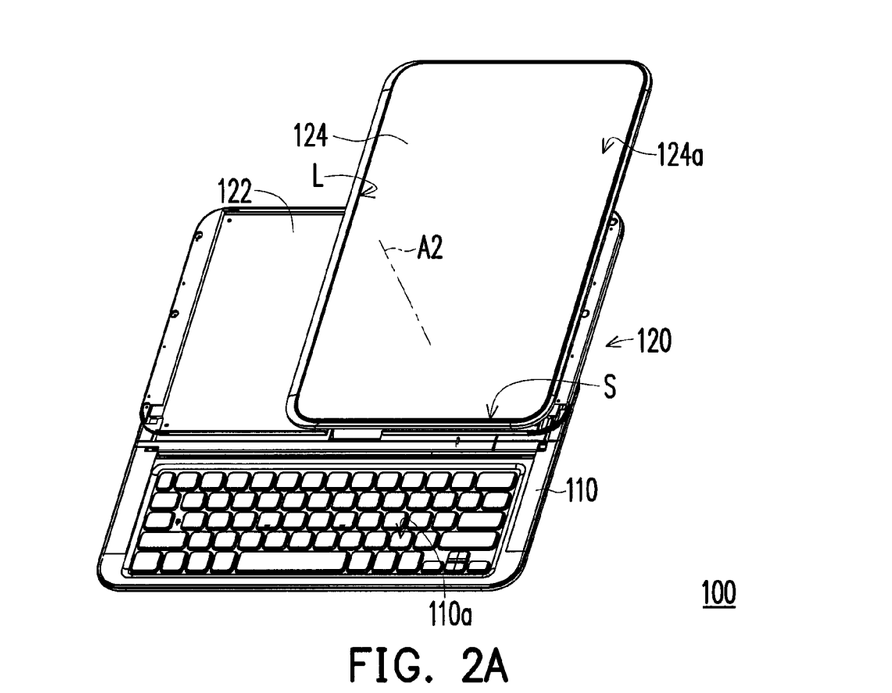
FIG. 2A is a schematic view of the main body pivoting relative to the back cover of FIG. 1B.
Figure 2B:
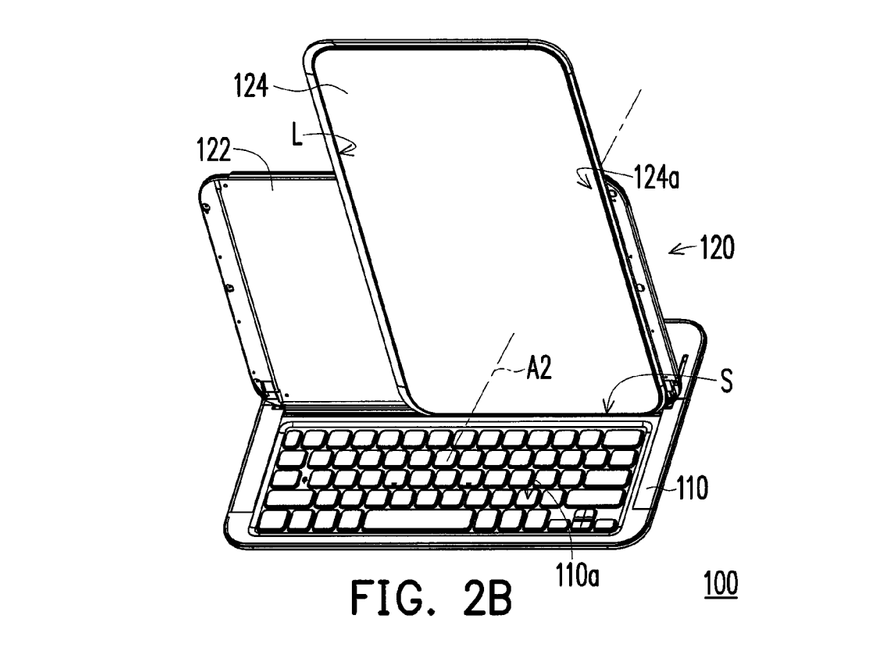
FIG. 2B is a schematic view of the main body pivoting relative to the back cover of FIG. 1C.

FIG. 2A is a schematic view of the main body pivoting relative to the back cover of FIG. 1B. FIG. 2B is a schematic view of the main body pivoting relative to the back cover of FIG. 1C. The main body 124 is suitable for pivoting relative to the back cover 122 from the state shown in FIG. 1B to the state shown in FIG. 2A, or pivoting relative to the back cover 122 from the state shown in FIG. 1C to the state shown in FIG. 2B, such that a user can change a relative position between the first operating surface 110a and the second operating surface 124a according to the requirement of the user to enhance the convenience of the portable electronic device 100 in use.

In detail, the second operating surface 124a of the present embodiment is in rectangular shape and has a long side L and a short side S. When the second operating surface 124a (display interface) displays images in landscape display mode, the user can adjust the relative position between the first operating surface 110a (input interface) and the second operating surface 124a to the state shown in FIG. 1B or FIG. 1C, such that the long side L is parallel to the third axis A3 for the user to perform input action by the first operating surface 110a easily while viewing the images displayed by the second operating surface 124a from an appropriate view angle. When the second operating surface 124a (display interface) displays images in portrait display mode, the user can adjust the relative position between the first operating surface 110a (input interface) and the second operating surface 124a to the state shown in FIG. 2A or FIG. 2B, such that the short side S is parallel to the third axis A3 for the user to perform input action by the first operating surface 110a easily while viewing the images displayed by the second operating surface 124a from an appropriate view angle.

In the present embodiment, when the second body 120 exposes the first operating surface 110a of the first body 110, the distance between the second axis A2 (where the main body 124 and the back cover 122 are pivotally connected) and the short side S is smaller than the distance between the second axis A2 and the first operating surface 110a. With the design described above, when the main body 124 pivots relative to the back cover 122 to the state shown in FIG. 2A or FIG. 2B, the main body 124 shielding the first operating surface 110a of the first body 110 can be avoided.

Figure 3:
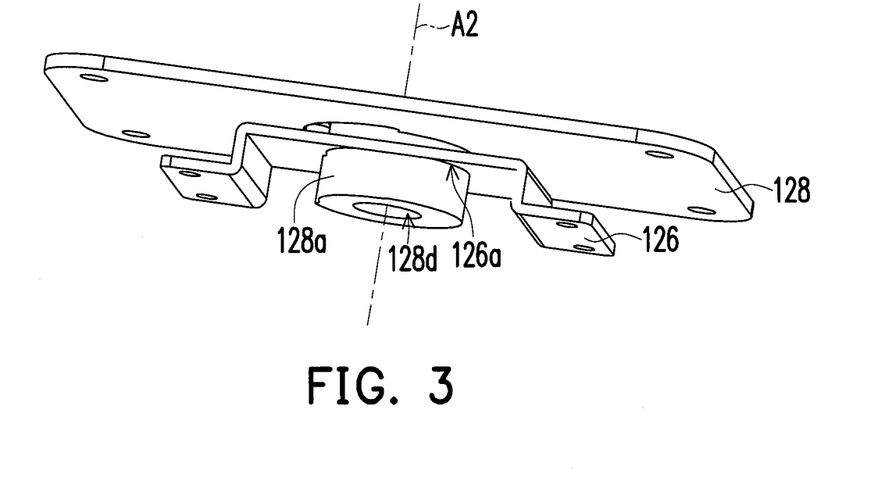
FIG. 3 is a partial three-dimension view of the second body of FIG. 1A.
Figure 4:
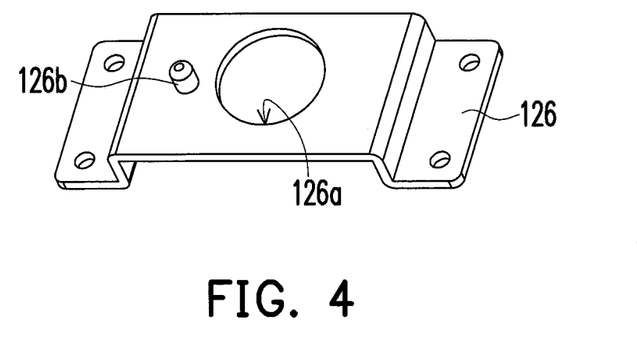
FIG. 4 is a three-dimensional view of the first pivoting element of FIG. 3.
Figure 5:
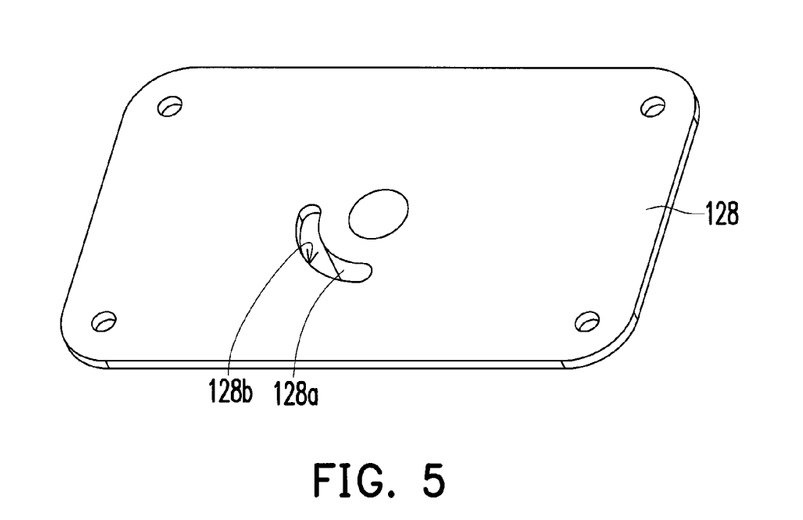
FIG. 5 is a three-dimensional view of the second pivoting element of FIG. 3.

FIG. 3 is a partial three-dimension view of the second body of FIG. 1A. FIG. 4 is a three-dimensional view of the first pivoting element of FIG. 3. FIG. 5 is a three-dimensional view of the second pivoting element of FIG. 3. For clearer illustration, the back cover 122 and the main body 124 of FIG. 1A are not shown in FIG. 3 to FIG. 5. Referring to FIG. 3 to FIG. 5, in the present embodiment, the second body 120 (shown in FIG. 1A) further includes a first pivoting element 126 and a second pivoting element 128. The first pivoting element 126 having an axial hole 126a is fixed on the main body shown in FIG. 1A. The second pivoting element 128 having a shaft 128a is fixed on the back cover 122 shown in FIG. 1A. The second pivoting element 128 is pivotally connected to the axial hole 126a of the first pivoting element 126 by the shaft 128a along the second axis A2 as shown in FIG. 3. With the first pivoting element 126 and the second pivoting element 128 pivotally connected to each other, the main body 124 can pivot relative to the back cover 122 to the states shown in FIG. 2A and FIG. 2B.

Figure 6:
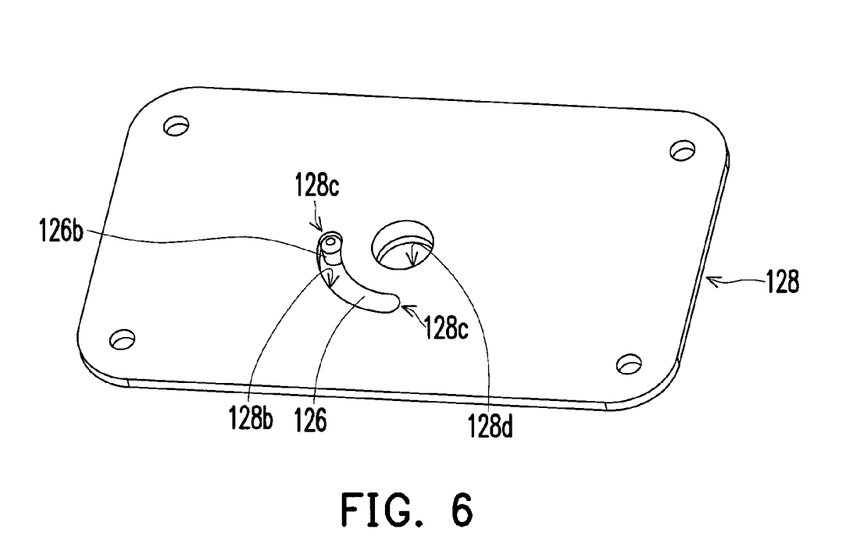
FIG. 6 is a three-dimensional view of the first pivoting element and the second pivoting element of FIG. 3 in another point of view.

FIG. 6 is a three-dimensional view of the first pivoting element and the second pivoting element of FIG. 3 in another point of view. The first pivoting element 126 of the present embodiment has a boss 126b as shown in FIG. 4, and the second pivoting element 128 has a slot 128b as shown in FIG. 5. When the second pivoting element 128 is pivotally connected to the axial hole 126a of the first pivoting element 126 by the shaft 128a along the second axis A2 as shown in FIG. 3, the boss 126b of the first pivoting element 126 is slidably disposed in the slot 128b of the second pivoting element 128 as shown in FIG. 6. The slot 128b has two opposing ends 128c. The boss 126b is suitable for sliding along the slot 128b according to the relative pivoting between the first pivoting element 126 and the second pivoting element 128. The two ends 128c of the slot 128b is suitable for stopping the boss 126b in order to limit the pivoting range of the main body 124 relative to the back cover 122. For example, the extension range of the slob 128b of the present embodiment is designed as quarter arc and the limitation of the greatest pivoting angle of the main body 124 relative to the back cover 122 is 90 degree. The main body 124 is restricted to pivoting relative to the back cover 122 only between the state shown in FIG. 1B and the state shown in FIG. 2A (or between the state shown in FIG. 1C and the state shown in FIG. 2B), such that the first operating surface 110a of the first body 110 is not shielded by the main body 124. In other embodiments, the main body 124 can have other suitable pivoting ranges relative to the back cover 122, which should not be construed as a limitation to the present invention.

Figure 7:
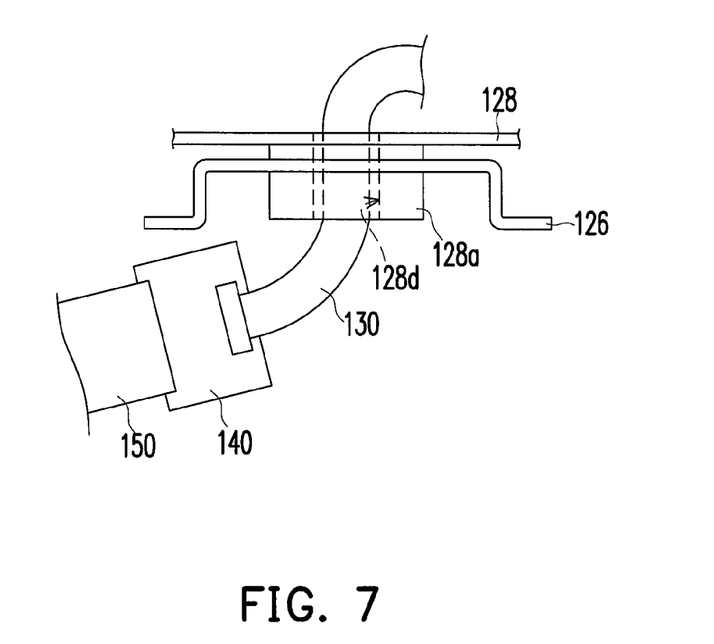
FIG. 7 is a partial schematic view of the portable electronic device of FIG. 1A.

FIG. 7 is a partial schematic view of the portable electronic device of FIG. 1A. For clearer illustration, the first body 110 and the second body 120 of FIG. 1A are not shown in FIG. 7. Referring to FIG. 1A and FIG. 7, in the present embodiment, the portable electronic device 100 further comprises a conducting wire 130. The shaft 128a of the second pivoting element 128 is hollow so as to form a channel 128d. The conducting wire 130 passes the channel 128d to electronically connect the main body 124 and the first body 110 as shown in FIG. 1A. In detail, the portable electronic device 100 further comprises a printed circuit board (PCB) 140 and a flexible printed circuit (FPC) 150. The PCB 140 is fixed on the back cover 122 as shown in FIG. 1A and the FPC 150 is connected between the PCB 140 and the first body 110 as shown in FIG. 1A. The conducting wire 130 is connected between the PCB 140 and the main body 124 as shown in FIG. 1A. In other words, the main body 124 of the second body 120 is electronically connected to the first body 110 by the conducting wire 130, the PCB 140 and the FPC 150.

As the disposition described above, the FPC 150 is connected between the PCB 140 disposed on the back cover 122 and the first body 110, and does not pass the first pivoting element 126 and the second pivoting element 128 which are pivotally connected to each other, so when the main body 124 pivoting relative to the back cover 122 between the state shown in FIG. 1B and the state sown in FIG. 2A (or between the state shown in FIG. 1C and the state shown in FIG. 2B), the FPC 150 would not be bent, so as to avoid damaging the FPC 150. The conducting wire 130 with flexibility is connected between the PCB 140 and the main body 124 and passes the first pivoting element 126 and the second pivoting element 128 which are pivotally connected to each other, so when the main body 124 pivoting relative to the back cover 122, the conducting wire 130 can be bent accordingly without causing any damage.

Figure 8:
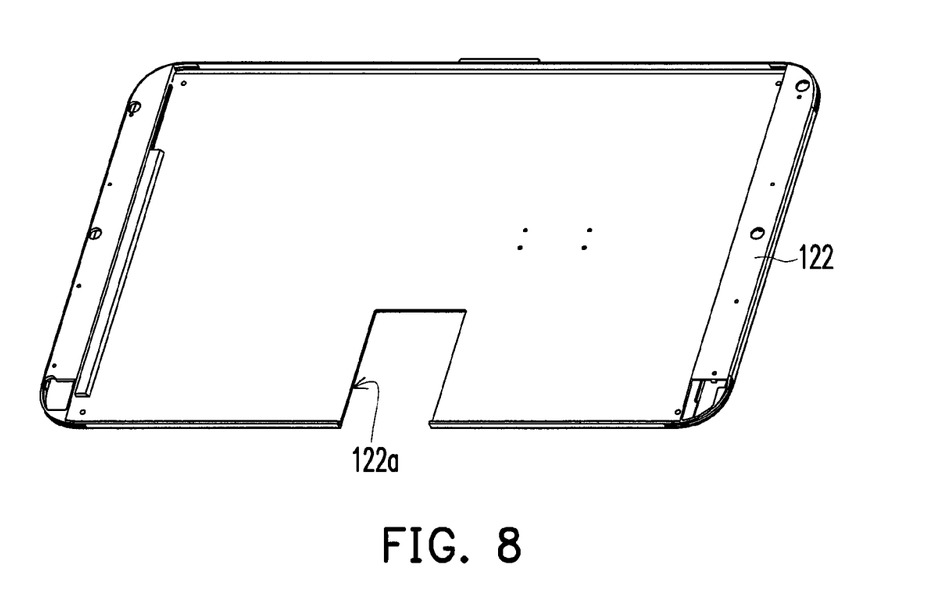
FIG. 8 is a three-dimensional view of the back cover of FIG. 1A.

FIG. 8 is a three-dimensional view of the back cover of FIG. 1A. Referring to FIG. 1A and FIG. 8, the back cover 122 of the present embodiment located between the main body 124 and the first body 110 has a notch 122a. The FPC 150 shown in FIG. 7 passes through the notch 122a to electronically connect the main body 124 and the first body 110. When the back cover 122 sliding relative to the first body 110 between the state shown in FIG. 1A and the state shown in FIG. 1B, the notch 122a provides the FPC 150 enough moving space which enables the whole structure to be operated smoothly.

Figure 9:
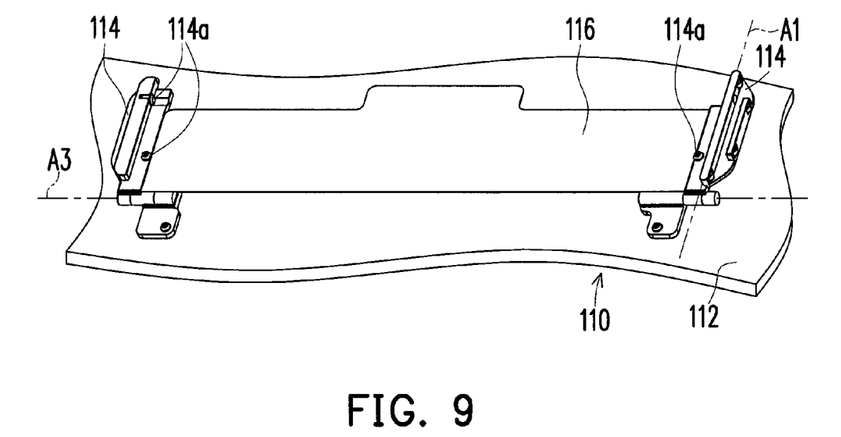
FIG. 9 is a partial three-dimension view of the first body of FIG. 1A.

FIG. 9 is a partial three-dimension view of the first body of FIG. 1A. For clearer illustration, the second body 120 of FIG. 1A is not shown in FIG. 9. Referring to FIG. 1A to FIG. 9, the first body 110 of the present embodiment comprises a base 112 and at least one connecting element 114 (two are illustrated). The connecting elements 114 are pivoted to the base 112 along the third axis A3. The two opposing ends of the back cover 122 shown in FIG. 1A are slidably disposed respectively on the two connecting elements 114. The back cover 122 can slide on the connecting elements 114 along the first axis A1, such that the second body 120 slides relative to the first body 110 between the state shown in FIG. 1A and the state shown in FIG. 1B. Moreover, by the connecting elements 114 pivoting relative to the main body 112 along the third axis A3, the back cover 122 is driven to pivot along the third axis A3, such that the second body 120 is operated between the state shown in FIG. 1B and the state shown in FIG. 1C.

As shown in FIG. 9, the first body 110 of the present embodiment further comprises a bracket 116. Two ends of the bracket 116 are respectively fixed to the two connecting elements 114 to further enhance the stability of the whole structure. Furthermore, the connecting elements 114 of the present embodiment can include a plurality of protrusions 114a for contacting the back cover 122 shown in FIG. 1A and sliding on a surface of the back cover 122 to reduce the friction between the back cover 122 and the connecting elements 114, such that the whole structure can be operated more smoothly. The material of each protrusion 114a is, for example, POM or other suitable material, which is not limited in the present invention.

According to the above descriptions, in the portable electronic device of the present invention, when the second body exposes the first operating surface of the first body, the main body of the second body can pivot relative to the back cover such that the second operating surface of the main body rotates relative to the first operating surface of the first body. Thus, users can adjust the relative position between the first operating surface and the second operating surface according to the requirement of the users for enhancing the convenience of the portable electronic device in use. Furthermore, the position where the main body and the back cover are pivotally connected and the pivoting range of the main body relative to the back cover can be further limited to prevent the main body from shielding the first operating surface of the first body.

Although the invention has been described with reference to the above embodiments, it will be apparent to one of ordinary skill in the art that modifications to the described embodiments may be made without departing from the spirit of the invention. Therefore, the protecting range of the invention falls in the appended claims.

What is claimed is:

1. A portable electronic device, comprising:
   a first body, having a first operating surface; and
   a second body, covering the first operating surface, and comprising:
   a back cover, slidably disposed on the first body along a first axis, wherein the back cover is suitable for sliding relative to the first body, such that the second body exposes the first operating surface; and
   a main body, pivoted to the back cover along a second axis and having a second operating surface, wherein the main body is suitable for pivoting relative to the back cover to change a relative position between the first operating surface and the second operating surface, the first axis is parallel to the second operating surface, and the second axis is perpendicular to the second operating surface, wherein the back cover is suitable for pivoting relative to the first body, such that the second body inclines to the first body, and when the second body inclines to the first body, the first axis is parallel to the second operating surface.

2. The portable electronic device as claimed in claim 1, wherein the first operating surface is an input interface, and the second operating surface is a display interface.

3. The portable electronic device as claimed in claim 1, wherein when the second body exposes the first operating surface, the back cover is suitable for pivoting along a third axis, such that the second body inclines to the first body, wherein the third axis is perpendicular to the first axis and the second axis.

4. The portable electronic device as claimed in claim 3, wherein the second operating surface is in rectangular shape and has a long side and a short side, the long side is parallel to the third axis, and the main body is suitable for pivoting relative to the back cover such that the short side is parallel to the third axis.

5. The portable electronic device as claimed in claim 4, wherein when the second body exposes the first operating surface, the distance between the second axis and the short side is smaller than the distance between the second axis and the first operating surface.

6. The portable electronic device of claim 3, wherein the first body comprises:
 a base; and
 at least one connecting element, pivoted to the base along the third axis, wherein the back cover is slidably disposed on the connecting element along the first axis.

7. The portable electronic device as claimed in claim 6, wherein the first body further comprises a bracket, the number of the at least one connecting elements is two, two opposing ends of the back cover are slidably disposed respectively on the two connecting elements, and two ends of the bracket are respectively fixed to the two connecting elements.

8. The portable electronic device as claimed in claim 1, wherein the second body further comprises:
 a first pivoting element, fixed on the main body and having an axial hole; and
 a second pivoting element, fixed on the back cover and having a shaft, wherein the second pivoting element is pivotally connected to the axial hole by the shaft.

9. The portable electronic device as claimed in claim 8, wherein the first pivoting element has a boss, the second pivoting element has a slot, the boss is slidably disposed in the slot and is suitable for sliding along the slot according to a relative pivoting between the first pivoting element and the second pivoting element, the slot has two opposing ends, and the two ends are suitable for stopping the boss in order to limit the pivoting range of the main body relative to the back cover.

10. The portable electronic device as claimed in claim 8, further comprising a conducting wire, wherein the shaft is hollow so as to form a channel, and the conducting wire passes the channel to electronically connect the main body and the first body.

11. The portable electronic device as claimed in claim 1, further comprising a flexible printed circuit (FPC), wherein the back cover has a notch and is located between the main body and the first body, and the FPC passes through the notch to electronically connect to the main body and the first body.

12. The portable electronic apparatus as claimed in claim 1, further comprising:
 a printed circuit board (PCB), fixed on the back cover;
 a flexible printed circuit (FPC), connected between the PCB and the first body; and
 a conducting wire, connected between the PCB and the main body, wherein the main body is electronically connected to the first body by the conducting wire, the PCB and the FPC.

13. A portable electronic device, comprising:
a first body, having a first operating surface; and
a second body, covering the first operating surface, and comprising:
 a back cover, slidably disposed on the first body along a first axis, wherein the back cover is suitable for sliding relative to the first body, such that the second body exposes the first operating surface;
 a main body, pivoted to the back cover along a second axis and having a second operating surface, wherein the main body is suitable for pivoting relative to the back cover to change a relative position between the first operating surface and the second operating surface, the first axis is parallel to the second operating surface, and the second axis is perpendicular to the second operating surface;
 a first pivoting element, fixed on the main body and having an axial hole; and
 a second pivoting element, fixed on the back cover and having a shaft, wherein the second pivoting element is pivotally connected to the axial hole by the shaft.

14. A portable electronic device, comprising:
a flexible printed circuit (FPC);
a first body, having a first operating surface; and
a second body covering the first operating surface and comprising:
 a back cover, slidably disposed on the first body along a first axis, wherein the back cover is suitable for sliding relative to the first body, such that the second body exposes the first operating surface; and
 a main body, pivoted to the back cover along a second axis and having a second operating surface, wherein the main body is suitable for pivoting relative to the back cover to change a relative position between the first operating surface and the second operating surface, the first axis is parallel to the second operating surface, and the second axis is perpendicular to the second operating surface,
wherein the back cover has a notch and is located between the main body and the first body, and the FPC passes through the notch to electronically connect to the main body and the first body.

* * * * *